(12) United States Patent
Glugla et al.

(10) Patent No.: US 10,753,290 B2
(45) Date of Patent: Aug. 25, 2020

(54) METHOD AND SYSTEM FOR DETERMINING ENGINE KNOCK BACKGROUND NOISE LEVELS

(71) Applicant: Ford Global Technologies, LLC, Dearborn, MI (US)

(72) Inventors: Christopher Paul Glugla, Macomb, MI (US); Rani Kiwan, Ann Arbor, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 16/144,762

(22) Filed: Sep. 27, 2018

(65) Prior Publication Data
US 2020/0102897 A1    Apr. 2, 2020

(51) Int. Cl.
| F02D 35/02 | (2006.01) |
| F02D 17/02 | (2006.01) |
| F02D 41/24 | (2006.01) |
| F02P 5/152 | (2006.01) |
| G01L 23/22 | (2006.01) |

(52) U.S. Cl.
CPC .......... *F02D 35/027* (2013.01); *F02D 17/02* (2013.01); *F02D 41/2461* (2013.01); *F02P 5/1525* (2013.01); *G01L 23/225* (2013.01)

(58) Field of Classification Search
CPC .... F02D 35/027; F02D 17/02; F02D 41/2461; F02P 5/1525; G01L 23/225
See application file for complete search history.

(56) References Cited

U.S. PATENT DOCUMENTS

| 6,763,297 | B1* | 7/2004 | Stahl | F02D 41/0087 |
| | | | | 123/198 DB |
| 9,759,145 | B2 | 9/2017 | Glugla et al. | |
| 2008/0127933 | A1* | 6/2008 | Blumberg | F02B 11/00 |
| | | | | 123/304 |
| 2009/0292439 | A1* | 11/2009 | Luken | F02D 17/02 |
| | | | | 701/102 |
| 2011/0093186 | A1 | 4/2011 | Hagari et al. | |
| 2011/0132327 | A1 | 6/2011 | Aso et al. | |
| 2011/0265453 | A1* | 11/2011 | Uhrich | F01N 3/0842 |
| | | | | 60/274 |
| 2011/0265454 | A1* | 11/2011 | Smith | F01N 3/0842 |
| | | | | 60/274 |

(Continued)

OTHER PUBLICATIONS

Hakeem, M. et al., "Method and System for Variable Displacement Engine Knock Control," U.S. Appl. No. 15/985,257, filed May 21, 2018, 77 pages.

(Continued)

*Primary Examiner* — Joseph J Dallo
(74) *Attorney, Agent, or Firm* — Geoffrey Brumbaugh; McCoy Russell LLP

(57) ABSTRACT

Methods and systems are disclosed for operating an engine that includes a knock control system that may determine contributions of individual noise sources to an engine background noise level. The contributions of the individual noise sources may be the basis for establishing the presence or absence of knock in one or more engine cylinders. The contributions of individual noise sources may be determined when engine cylinders are deactivated.

16 Claims, 8 Drawing Sheets

(56) References Cited

U.S. PATENT DOCUMENTS

| | | | | |
|---|---|---|---|---|
| 2011/0265771 | A1* | 11/2011 | Banker | F01N 3/0814 |
| | | | | 123/564 |
| 2012/0285161 | A1* | 11/2012 | Kerns | F02D 41/0087 |
| | | | | 60/598 |
| 2014/0278010 | A1* | 9/2014 | Hamama | F02D 35/027 |
| | | | | 701/106 |
| 2016/0115878 | A1* | 4/2016 | VanDerWege | F02D 41/1466 |
| | | | | 123/333 |
| 2017/0355374 | A1* | 12/2017 | Glugla | B60W 10/06 |
| 2017/0356353 | A1* | 12/2017 | Rollinger | F02D 13/06 |
| 2017/0356355 | A1* | 12/2017 | Rollinger | F02B 37/162 |
| 2017/0356358 | A1* | 12/2017 | Richards | F02D 9/02 |
| 2017/0356365 | A1* | 12/2017 | Glugla | F02D 41/0087 |
| 2017/0356366 | A1* | 12/2017 | Glugla | F02D 41/0087 |
| 2017/0356367 | A1* | 12/2017 | Glugla | F02D 13/06 |
| 2017/0356368 | A1* | 12/2017 | Richards | F02D 41/0087 |
| 2017/0356370 | A1* | 12/2017 | Doering | F02D 13/06 |
| 2017/0356371 | A1* | 12/2017 | Rollinger | F02D 41/0087 |
| 2017/0356372 | A1* | 12/2017 | Richards | F02D 13/04 |
| 2017/0356373 | A1* | 12/2017 | Willard | F02D 41/0087 |
| 2017/0356374 | A1* | 12/2017 | Rollinger | F02D 41/3005 |
| 2017/0356375 | A1* | 12/2017 | Glugla | B60W 10/11 |
| 2017/0356381 | A1* | 12/2017 | Richards | F02D 41/3094 |
| 2017/0370305 | A1* | 12/2017 | Nishio | F02P 5/152 |

OTHER PUBLICATIONS

Hakeem, M. et al., "Method and System for Adjusting Engine Knock Background Noise of a Variable Displacement Engine," U.S. Appl. No. 15/985,337, filed May 21, 2018, 75 pages.

Hakeem, M. et al., "Method and System for Adjusting Engine Knock Background Noise Levels," U.S. Appl. No. 15/985,428, filed May 21, 2018, 93 pages.

Kiwan, R. et al., "Method and System for Learning Contributions to an Engine Knock Background Noise Level," U.S. Appl. No. 16/122,065, filed Sep. 5, 2018, 49 pages.

Glugla, C. et al., "Method and System for Determining Piston Slap," U.S. Appl. No. 16/129,562, filed Sep. 12, 2018, 46 pages.

Glugla, C. et al., "Method and System for Detecting Engine Knock During Transient Conditions," U.S. Appl. No. 16/155,394, filed Oct. 9, 2018, 48 pages.

Kiwan, R. et al., "Method and System for Applying Engine Knock Windows," U.S. Appl. No. 16/170,869, filed Oct. 25, 2018, 68 pages.

Kiwan, R. et al., "Method and System for Engine Knock Detection," U.S. Appl. No. 16/171,247, filed Oct. 25, 2018, 52 pages.

Kiwan, R. et aL., "Method and System for Learning Contributions of Engine Knock Background Noise for a Variable Displacement Engine," U.S. Appl. No. 16/195,695, filed Nov. 19, 2018, 75 pages.

* cited by examiner

METHOD AND SYSTEM FOR DETERMINING ENGINE KNOCK BACKGROUND NOISE LEVELS

FIELD

The present application relates to methods and systems for determining engine knock background noise levels of an engine that may deactivate one or more engine cylinders from time to time.

BACKGROUND/SUMMARY

An engine may include one or more engine knock sensors to determine the presence or absence of engine knock in an internal combustion engine. The engine's cycle may total 720 crankshaft degrees and the engine's crankshaft cycle duration of 720 crankshaft degrees may be subdivided into one or more angular intervals where engine knock is expected to occur. These crankshaft angular intervals may be described as knock windows and there may be an individual and unique knock window for each cylinder of the engine. During a particular crankshaft interval where the knock window is described as "open," output of an engine knock sensor may be sampled and processed to determine the presence or absence of engine knock associated with a particular engine cylinder. The same engine may from time to time operate with less than the actual total number of engine cylinders combusting fuel. Consequently, one or more engine knock windows may not be utilized because the cylinders that these knock windows are associated with are deactivated and cannot knock. However, the controller that generates these engine knock windows and the knock sensor sampling that is associated with the engine knock windows may still utilize controller resources to generate the knock windows and sample the knock sensor. Further, the controller may be constrained in a way engine background noise levels may be determined when the engine is operating because of legislated emissions and fuel economy. Therefore, it may be desirable to provide a way of determining engine background noise levels that improves controller processor utilization while mitigating effects of learning engine background levels on engine emissions and fuel economy.

The inventors herein have developed an engine operating method, comprising: deactivating a cylinder for one or more cycles of the cylinder via a controller; learning a base engine knock background noise level associated with the cylinder while the cylinder is deactivated; and adjusting engine operation according to a knock indication determined from the base engine knock background noise level.

By learning base engine knock background noise levels when one or more engine cylinders is deactivated, it may be possible to provide the technical result of learning engine knock background noise levels during engine operating conditions where the effect on engine emissions may be reduced. Further, the engine knock background noise level may be determined via a knock window that is not utilized to determine engine knock so that at least some benefit is provided by processor utilization for generating the knock window and processing output of the knock sensor.

The present description may provide several advantages. In particular, the approach may improve controller utilization during conditions when functions provided by the controller might otherwise be less useful. Further, the approach may capture engine background noise levels during a knock window that would otherwise not be utilized during an engine cycle. Further still, an engine background noise level captured via a knock window of one cylinder may be used to determine an engine background noise level for a different cylinder without having to adjust valve timings of the different cylinder to determine the background noise level for the different cylinder.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
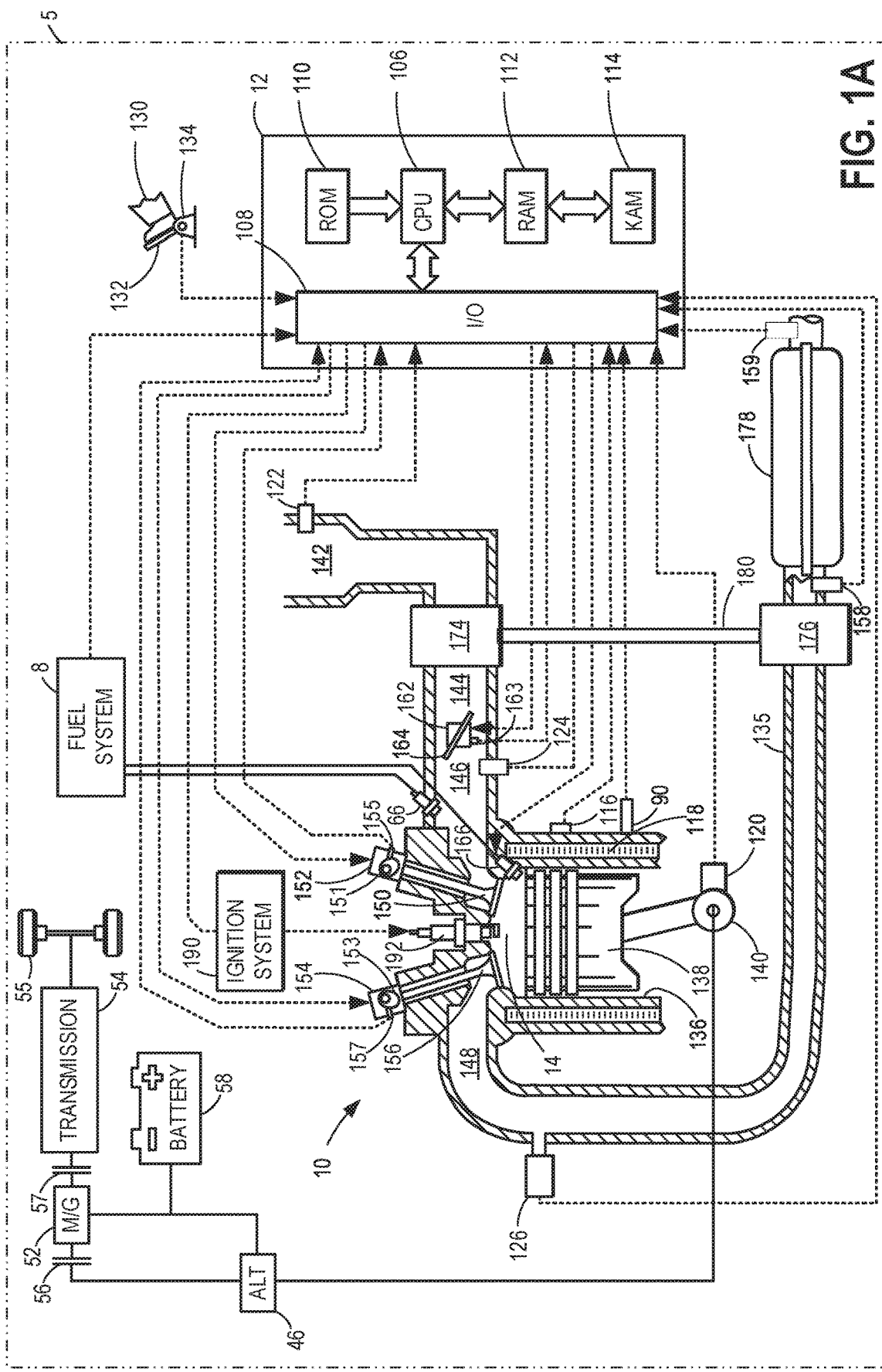
FIG. 1A shows a schematic depiction of an engine system of a vehicle.
Figure 1C:
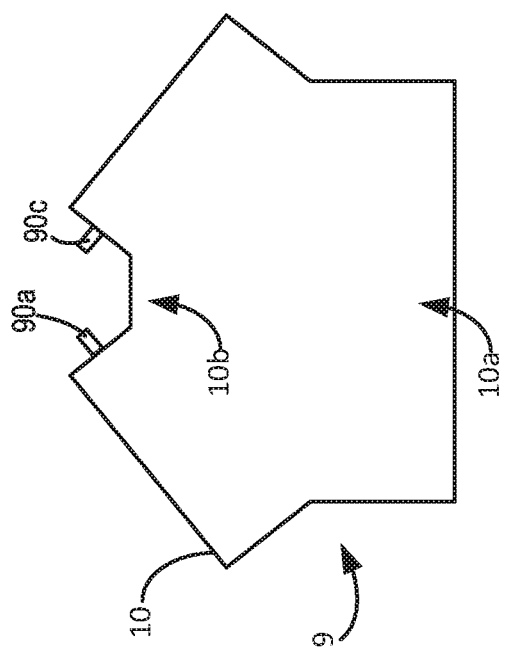
FIG. 1C shows an alternative view of knock sensor locations for the V8 engine.
Figure 1B:
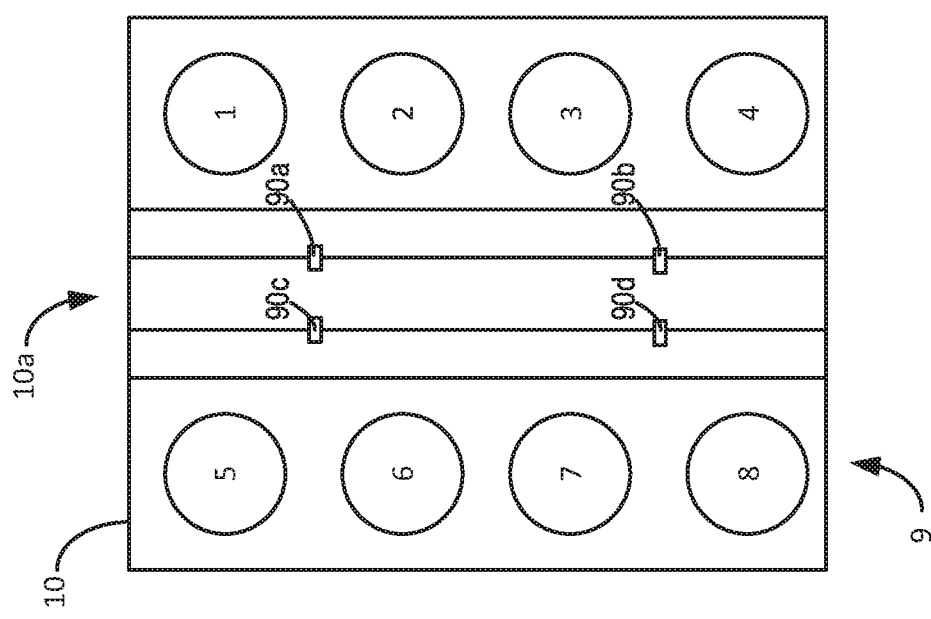
FIG. 1B shows example locations for knock sensors for a V8 engine.
Figure 3:
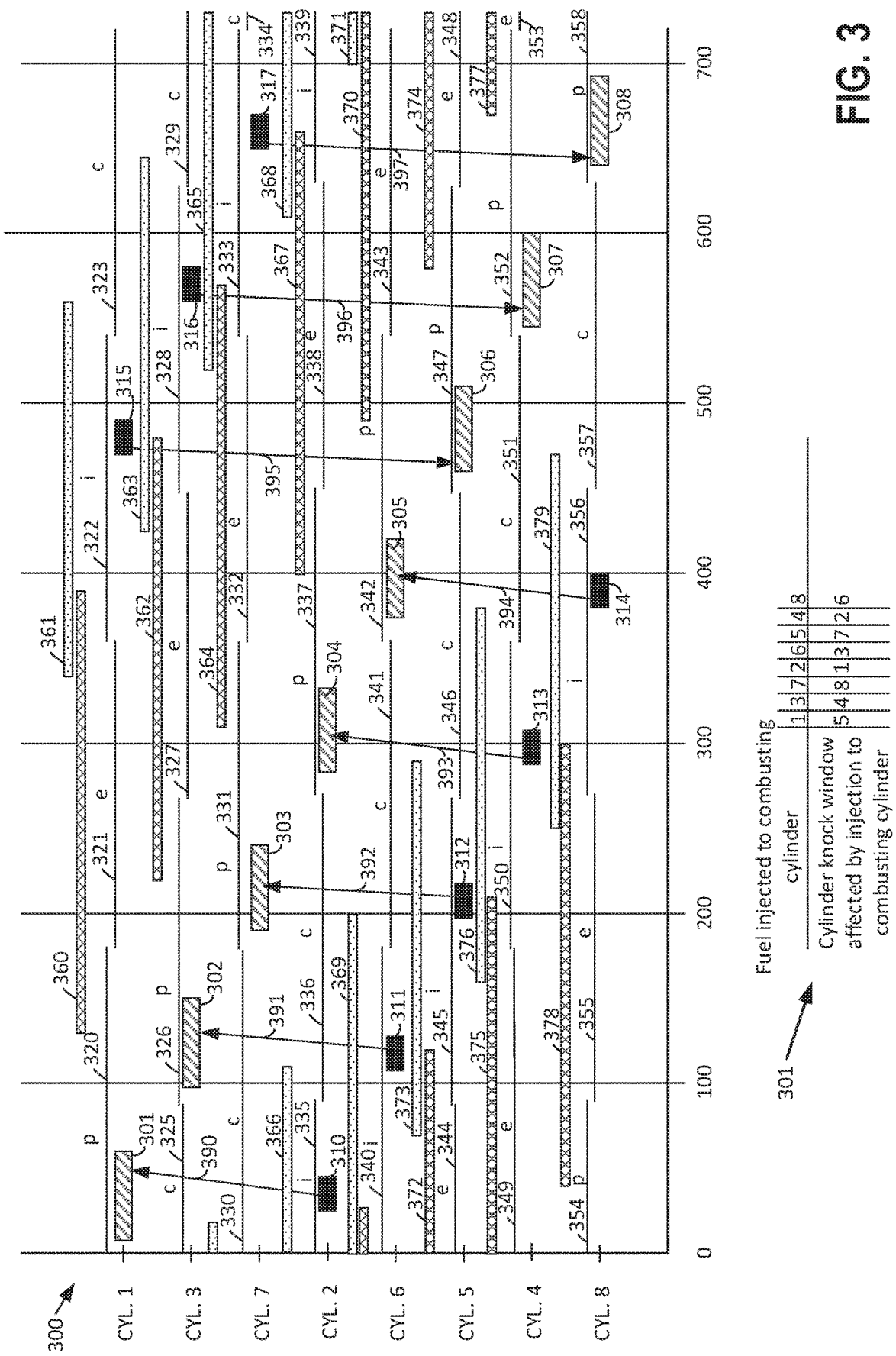
FIGS. 3-5 show example engine operating sequences for illustrating the method of FIGS. 2A-2C.
Figure 4:
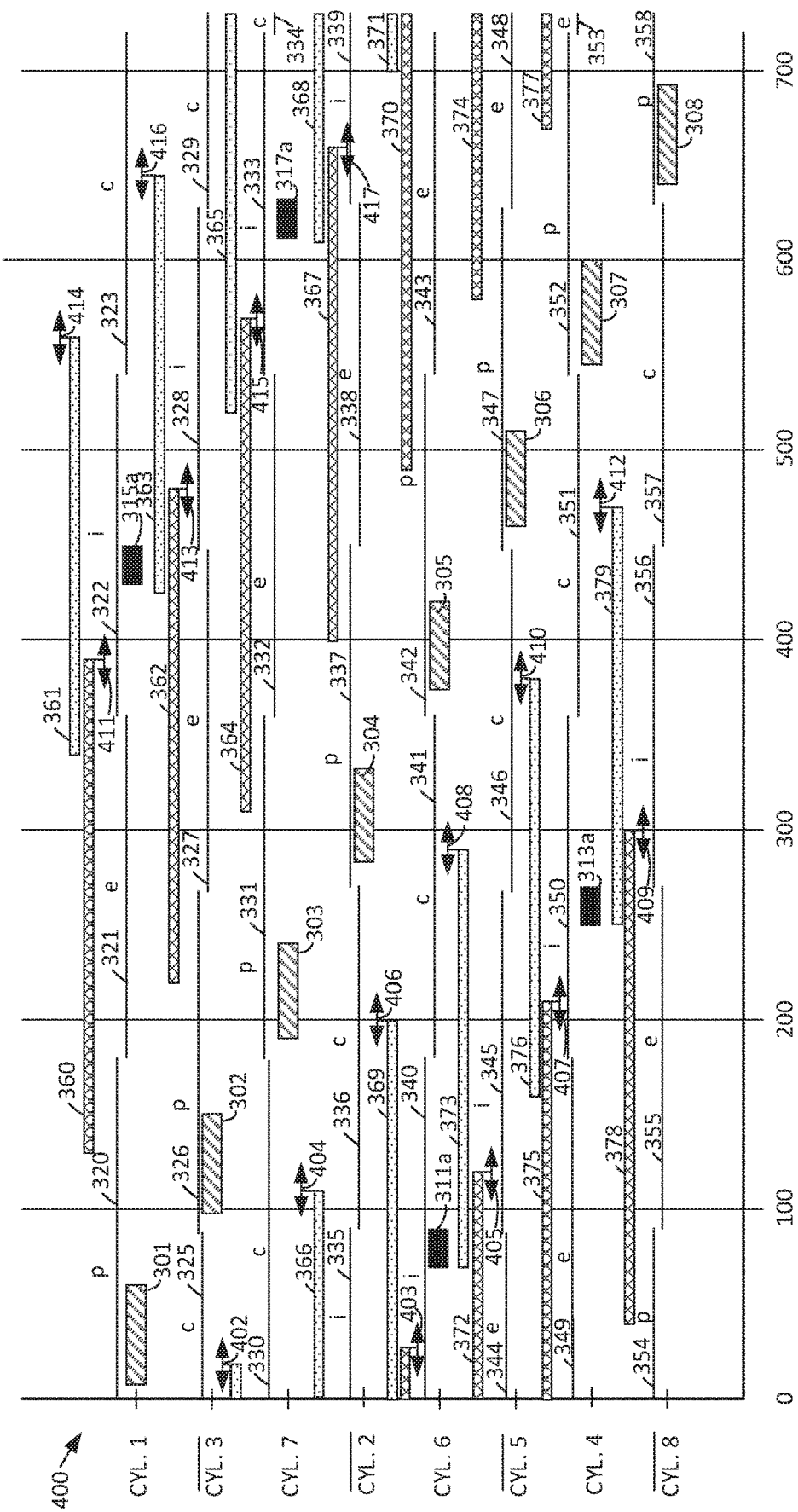
Figure 5:
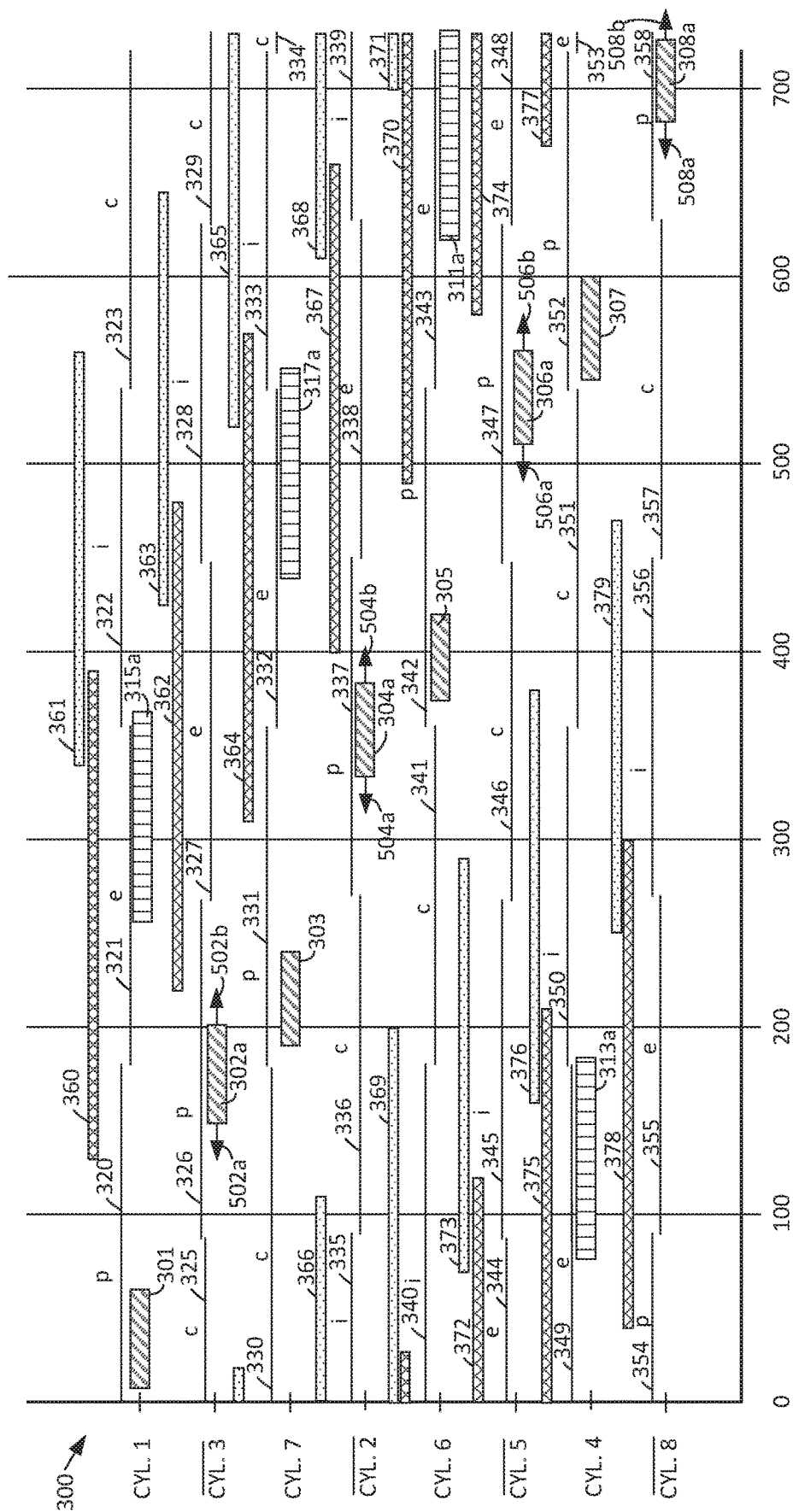

The following description relates to systems and methods for operating an engine that includes a knock control system. The engine may be of the type that is shown in FIGS. 1A-1C. The engine may be operated according to the method of FIGS. 2A-2C. The method may learn engine background noise levels for various operating conditions throughout the engine's life so that the possibility of accurately determining the presence of engine knock may be improved. The method may include utilizing engine knock windows of deactivated cylinders to determine engine background noise levels of other engine cylinders so that valve timings of the other cylinders may not need to be changed. FIGS. 3-5 show example engine operating sequences that illustrate some of the techniques described in FIGS. 2A-2C.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst. Oxygen sensor 159 may monitor emission control device 178 for degradation.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; oxygen sensor 159; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90a-90d. The knock sensors are positioned in the valley of engine block 9. In this example, output of knock sensor 90a is sampled via controller 12 during the knock windows (e.g., crankshaft angular intervals) of engine cylinders 1 and 2. Thus, knock sensor 90a is associated with cylinders 1 and 2. Output of knock sensor 90b is sampled via controller 12 during the knock windows of engine cylinders 3 and 4. Thus, knock sensor 90a is associated with cylinders 3 and 4. Output of knock sensor 90c is sampled via controller 12 during the knock windows of engine cylinders 5 and 6. Thus, knock sensor 90c is associated with cylinders 5 and 6. Output of knock sensor 90d is sampled via controller 12 during the knock windows of engine cylinders 7 and 8. Thus, knock sensor 90d is associated with cylinders 7 and 8. The plurality of knock sensors improves the ability to detect knock for each cylinder since attenuation of engine vibrations from knock increases as the distance from the knocking cylinder to the knock sensor increases. Knock sensor output is not sampled when the knock windows are closed.

Referring now to FIG. 1C, a front view of engine 10 is shown. Engine block 9 includes a valley 10b where engine knock sensors 90a and 90c are mounted to block 9. By mounting knock sensors 90a and 90c in the valley 10b, a good signal to noise ratio may be available so that knock may be more reliably detected. However, the mounting locations of knock sensors 90a-90d may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Thus, the system of FIGS. 1A-1C provides for a system for operating an engine, comprising: an engine including at least one vibration sensing engine knock sensor; and a controller including executable instructions stored in non-transitory memory to adjust timing of a knock window of a deactivated cylinder such that the knock window is open when a poppet valve of a different cylinder closes. The system includes where the knock window is adjusted in response to a request to diagnose a catalyst. The system includes where the different cylinder is an activated cylinder. The system includes where the deactivated cylinder is deactivated via holding poppet valves of the deactivated cylinder closed for one or more engine cycles. The system further comprises additional instructions to activate the different cylinder via port injecting fuel to the different cylinder in response to a request to diagnose a catalyst. The system further comprises additional instructions to activate the different cylinder via direct injecting fuel to the different cylinder in response to a request to diagnose a catalyst.

Figure 2A:
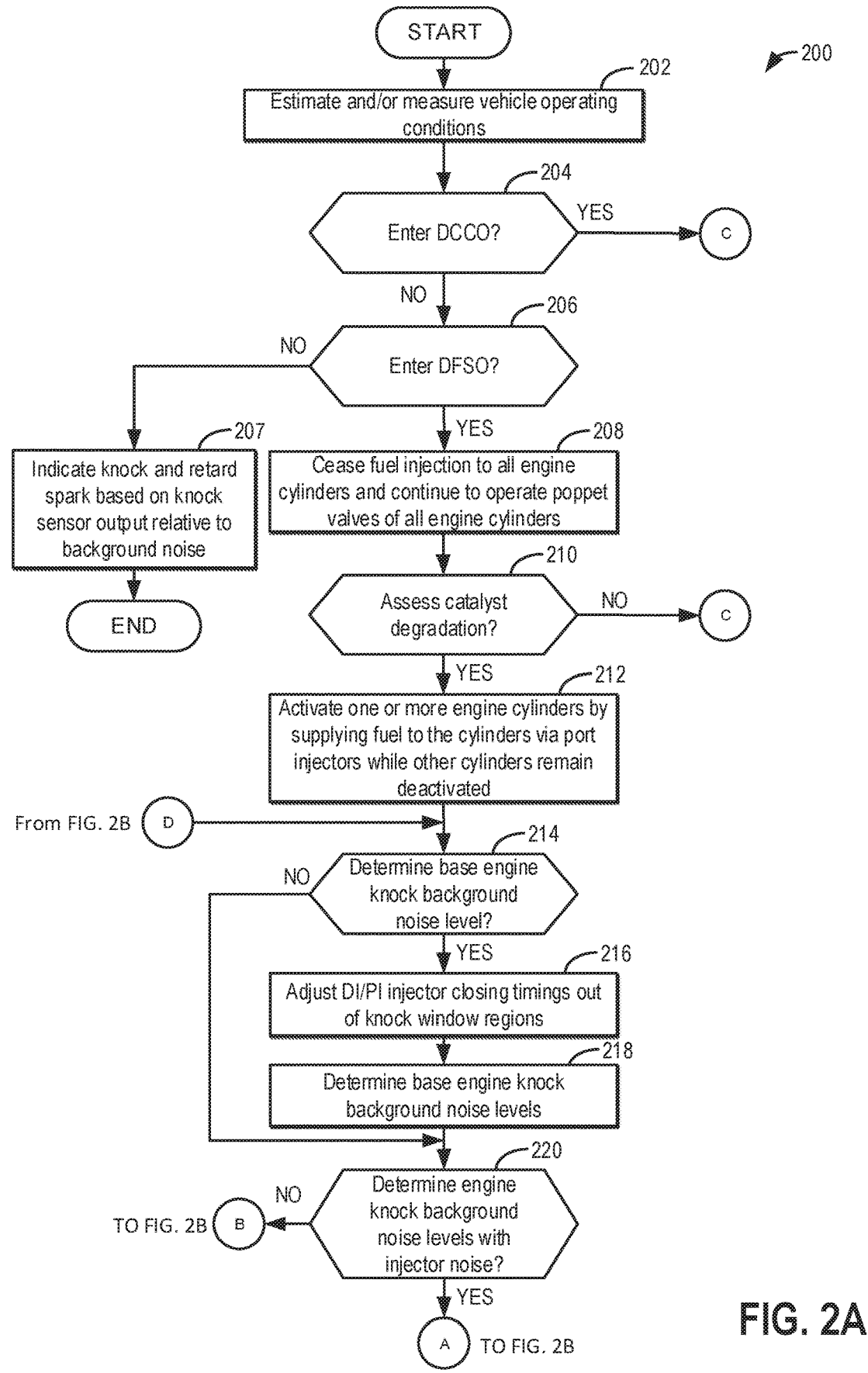
FIGS. 2A-2C shows a high level flow chart of a way to determine engine knock background noise levels.
Figure 2B:
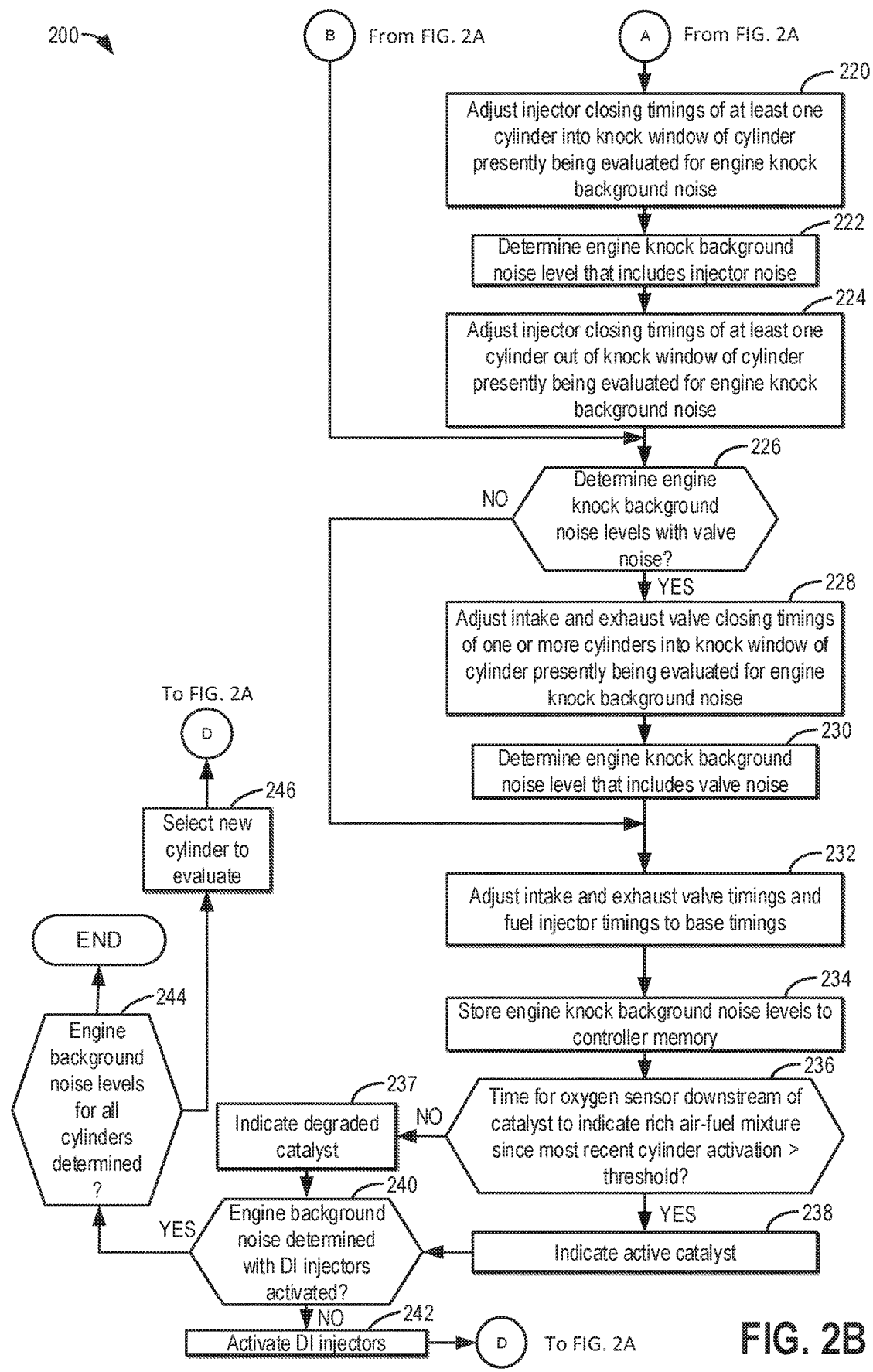
Figure 2C:
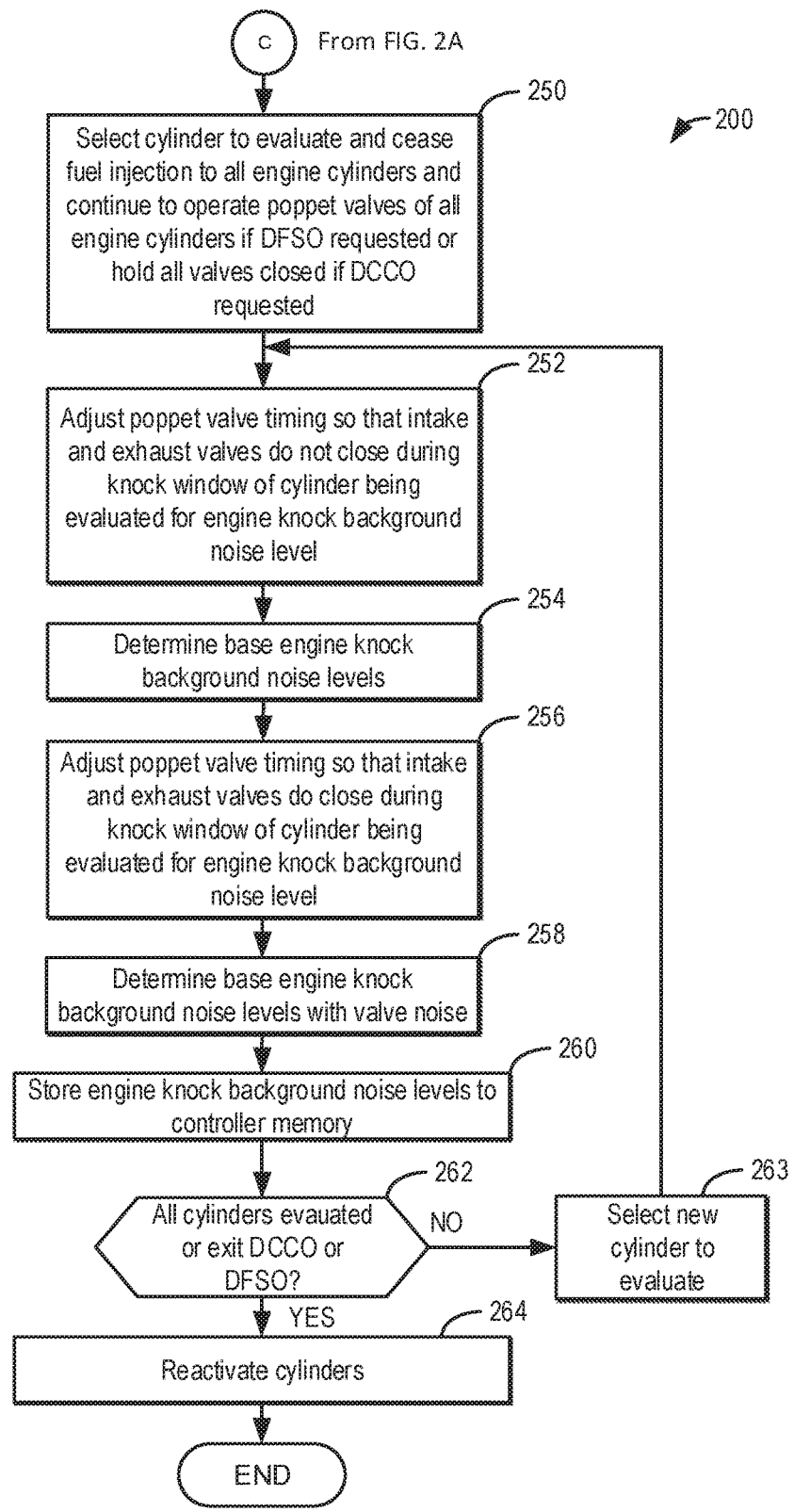

Referring now to FIGS. 2A-2C, a method for operating an engine is shown. The method of FIGS. 2A-2C may be included in and may cooperate with the system of FIGS. 1A-1C. At least portions of method 200 may be incorporated in the system of FIGS. 1A-1C as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs.

At 202, method 200 determines vehicle and engine operating conditions via the sensors described in FIGS. 1A-1C. Method 200 may determine operating conditions including but not limited to engine speed, engine load, engine temperature, ambient temperature, fuel injection timing, knock sensor output, fuel type, fuel octane, engine position, and engine air flow. Method 200 proceeds to 204.

At 204, method 200 judges if conditions are met for entering deceleration cylinder cut out (DCCO). Intake and exhaust poppet valves of one or more engine deactivated cylinders may be deactivated and held in a closed position over an entire engine cycle (e.g., two revolutions for a four stroke engine) when the one or more engine cylinders are deactivated in DCCO. Further, fuel injection to the one or more engine cylinders may be ceased when the one or more cylinders are deactivated in DCCO. In one example, the engine may enter DCCO mode when driver demand torque is less than a threshold torque and vehicle speed is greater than a threshold speed. Driver demand torque may be determined by referencing or indexing a table of empirically determined engine torque values by accelerator pedal position and vehicle speed. Further, the engine may enter DCCO mode responsive to other vehicle conditions. Additionally, method 200 may also judge if learning of engine knock background noise levels is requested. Learning of engine knock background noise levels may be requested after the vehicle has traveled a threshold distance or if knock has been detected more or less than may be expected. If method 200 judges that conditions are present for entering DCCO and learning of engine knock background noise is requested, the answer is yes and method 200 proceeds to 250. Otherwise, the answer is no and method 200 proceeds to 206.

At 206, method 200 judges if conditions are met for entering deceleration fuel shut off (DFSO). Intake and exhaust poppet valves of one or more engine deactivated cylinders are activated and open and close during an engine cycle when the one or more engine cylinders are deactivated in DFSO mode. Further, fuel injection to the one or more deactivated engine cylinders may be ceased in DFSO. In one example, the engine may enter DFSO mode when driver demand torque is less than a threshold torque and vehicle speed is greater than a threshold speed. Further, the engine may enter DFSO mode responsive to other vehicle conditions. Additionally, method 200 may also judge if learning of engine knock background noise levels is requested. Learning of engine knock background noise levels may be requested after the vehicle has traveled a threshold distance or if knock has been detected more or less than may be expected. If method 200 judges that conditions are present for entering DFSO and learning of engine knock background noise is requested, the answer is yes and method 200 proceeds to 208. Otherwise, the answer is no and method 200 proceeds to 207.

At 207, method 200 method 200 assesses whether or not knock should be indicated based on the engine knock background noise levels. In one example, method 200 computes a knock intensity value by integrating sampled output of the knock sensor during the knock window and dividing the integrated knock sensor output by the total engine knock background noise level. Note that the integration of the knock sensor for determining knock may occur during a different portion of the knock window than the integration of the output of the knock sensor during the knock window for determining engine knock background noise level. If the knock intensity value exceeds a threshold value (e.g., 2), then knock is indicated for the particular cylinder and spark timing for the particular cylinder is retarded by a predetermined amount. The spark is retarded for the particular cylinder and then the spark timing is advanced back toward the MBT (minimum spark advance for best engine torque at the present engine speed and load) spark timing. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., knock limited spark timing or MBT timing). Knock for each cylinder may be determined in this way. Method 200 proceeds to exit after adjusting engine spark timing for engine knock.

At 208, method 200 enters DFSO and deactivates fuel injection to one or more engine cylinders. The poppet valves of the deactivated cylinders continue to open and close during a cycle of the engine. In one example, fuel injection to all engine cylinders ceases when the engine enters DFSO mode. Since the poppet valves continue to operate while the engine is rotating, air may be pumped to the catalyst so that the oxygen sensor that is located downstream of the catalyst indicates a lean air-fuel mixture. Method 200 proceeds to 210.

At 210, method 200 judges if an assessment of catalyst degradation is to be made. The assessment may be made at predetermined intervals (e.g., after the vehicle has traveled a predetermined distance or after each engine start). If method 200 judges that conditions are present for assessing catalyst degradation, the answer is yes and method 200 requests assessment of catalyst degradation. Method 200 proceeds to 212 when the answer is yes. If method 200 judges that conditions are not present for assessing catalyst degradation, the answer is no and method 200 does not request an assessment of catalyst degradation. Method 200 proceeds to 250 when the answer is no.

At 212, one or more of the previously deactivated cylinders is reactivated by supplying fuel to the previously deactivated cylinder. Fuel is supplied to the cylinder via port fuel injectors so that an amount of time it takes for an oxygen sensor downstream of a catalyst to change state from indicating lean exhaust gas to indicating rich exhaust gas after activating the previously deactivated cylinder may be determined. The amount of time may be indicative of the catalyst's capacity to convert exhaust gas to $CO_2$ and $H_2O$. If the amount of time is shorter than a threshold amount of time, the catalyst may be determined to be degraded. If the amount of time is longer than the threshold amount of time, the catalyst may be determined to be performing as desired.

Reactivating one or more of the previously deactivated cylinders provides an opportunity to adjust knock windows of deactivated cylinders to detect noise levels that may be influenced by fuel injectors and valve timing when there may be less influence on vehicle drivability and emissions. For example, injection timings and knock window timings may be adjusted so that engine knock background noise levels with and without fuel injector noise may be determined. Further, intake and exhaust poppet valve timings may be adjusted so that engine knock background noise levels with and without poppet valve closing noise may be determined. The engine knock background noise levels without injector and poppet valve noise, with injector noise, and with poppet valve noise may then be the basis for determining the presence or absence of engine knock.

In addition, method 200 may select a particular cylinder or cylinders for determining engine knock background noise levels associated with the selected cylinder. For example, it may be desired to determine engine knock background noise levels and contributions to the engine knock background noise levels for cylinder number one. Cylinder number one may be selected as a cylinder for which engine knock background noise levels are determined. In one example, the selected cylinder may begin with cylinder number one and the selected cylinder may be incremented each time engine knock background noise levels and contributions have been determined for the selected cylinder. Method 200 proceeds to 214.

At 214, method 200 judges if there is a request to determine a base engine knock background noise levels. In one example, a request to determine a base engine knock background noise level may be generated when the engine operates at a particular speed and load at which the engine has not operated for a predetermined amount of time. In another example, a request to determine a base engine knock background noise level may be generated when the engine operates at a speed and load where the engine has not previously operated after the engine was manufactured. If method 200 judges that a request to determine a base engine knock background noise level is present, the answer is yes and method 200 proceeds to 216. Otherwise, the answer is no and method 200 proceeds to 220.

At 216, adjusts direct injectors and/or port injector timings such that the direct and port injectors do not close or open during a knock window that is associated with a particular cylinder (e.g., a cylinder selected for determining engine knock background noise levels). The particular cylinder may be a cylinder that is deactivated so that the knock window of the deactivated cylinder may determine engine knock background noise levels for itself or other engine cylinders. A knock window that is associated with a particular cylinder is a knock window in which output of a knock sensor is sampled and filtered to determine if there is knock in the particular cylinder. A knock window that is associated with a particular cylinder may be timed such that the knock window opens (e.g., starts sampling the knock sensor, filters output of the knock sensor, and begins processing output of the knock sensor to determine the presence or absence of knock in the particular cylinder) at a predetermined crankshaft angle and closes (e.g., ceases sampling the knock sensor and ceases filtering output of the knock sensor to determine the presence or absence of knock in the particular cylinder) at a predetermined crankshaft angle. FIG. 4 shows an example sequence where fuel injector timings of reactivated cylinders are adjusted from base timings so fuel injector closing timings do not fall in engine knock windows. Further, FIG. 4 shows valve timing adjustments that may be made when cylinders are reactivated so that valve closing events do not occur when knock windows of cylinders are open so that base engine knock background noise levels may be determined. Thus, method 200 may also adjust intake and/or exhaust valve closing timings so that they do not occur within selected engine knock windows. The intake and exhaust valve timings may be advanced or retarded so that intake and exhaust valve closing events do not occur within selected engine knock windows. Method 200 proceeds to 218.

FIG. 4 shows an engine operating sequence where direct fuel injection of cylinder numbers six, four, seven, and one have been advanced so as to avoid entering the engine knock windows of cylinder numbers three, two, five, and eight. For example, base direct injection 311 of cylinder six has been advanced to 311a to avoid closing the direct injector of cylinder six during knock window 302 of cylinder number three. This allows a base engine knock background noise level to be established during the timing that the knock window of cylinder number three is open.

Alternatively, timing of one or more engine knock windows of deactivated cylinders may be adjusted to determine base cylinder background noise levels that do not include noise from fuel injectors and/or intake and/or exhaust poppet valves that open and/or close during a knock window of one or more selected cylinders. For example, as shown in FIG. 5, the time that the knock window associated with deactivated cylinder number three (e.g., 302a) is open may be adjusted so as to avoid being open when the port injector of cylinder number four (e.g., 313a) closes and the intake valve of cylinder number six (e.g., 369) closes. Thus, the crankshaft angle at which the knock window associated with the cylinder opens and the crankshaft angle at which the knock window associated with the cylinder closes may be adjusted so that the knock window associated with the cylinder is not open when a fuel injector or intake or an exhaust valve opens or closes.

At 218, method 200 determines a base background noise level Cyl_base_noise (i) for the selected cylinder or cylinders. In one example, method 200 integrates output of a vibration sensor during a portion of the open knock window of the selected cylinder. The output of the vibration sensor may be integrated numerically or via an integrator circuit to determine the base background noise level of the selected cylinder. Method 200 proceeds to 220 after determining and storing the base background noise level to controller memory.

At 220, method 200 judges if there is a request to determine engine knock background noise levels with fuel injector noise included in the engine knock background noise level. In one example, a request to determine engine knock background noise levels with fuel injector noise included in the engine knock background noise levels may be generated when a fuel injector is expected to close during a crankshaft interval when a knock window of the selected cylinder is open. The fuel injector may be expected to close during the crankshaft interval when the knock window of the selected cylinder is open and the engine is operating at a same or different engine speed and load as the present engine speed and load. Of course, method 200 may judge to determine engine knock background noise levels with fuel injector noise included in the engine knock background noise level according to other conditions. Further, the base engine knock background noise level may be subtracted from the engine knock background noise level with fuel injector noise included to determine the noise contribution of fuel injector closing to the total engine background noise level.

In one example, the engine background noise level may be determined via the following equation:

$$Cyl\_bkg\_noise(i)=Cyl\_base\_noise(i)+Cyl\_inj\_noise(i)+Cyl\_vlv\_noise(i)$$

where Cyl_bkg_noise(i) is the total cylinder background noise level for cylinder i at the present engine speed and load, Cyl_base_noise (i) is a base cylinder background noise level that does not include noise from fuel injectors and/or intake and/or exhaust poppet valves that open and/or close during a knock window of cylinder (i), Cyl_inj_noise (i) is a fuel injector noise that occurs during a knock window of cylinder (i), and Cyl_vlv_noise (i) is noise from intake/exhaust valves that open and/or close during a knock window of cylinder (i), and where i is the number (e.g., 1-8 for an eight cylinder engine) of the cylinder which is presently being evaluated for the engine knock background noise level. It should be noted that noise of cylinders other than the present cylinder i may be applied or used in place of noise from cylinder i when the noise level of another cylinder is representative of the noise of cylinder i or when the noise level for cylinder i is not available and the noise level of another cylinder is available. For example, Cyl_bkg_noise (i) may be equal to Cyl_base_noise (i−1)+Cyl_inj_noise (i+2)+Cyl_vlv_noise (i+2). Thus, in this example, the total cylinder background noise for cylinder i may be equal to the base cylinder background noise level for cylinder i−1 plus the cylinder background fuel injector noise for cylinder i+2 plus the cylinder background valve noise for cylinder i+2. Further, when poppet valves do not close during the knock window of the present cylinder being evaluated for engine knock background noise, the noise contribution of fuel injectors may be determined via the following equation:

$$Cyl\_inj\_noise(i) = Cyl\_bkg\_noise(i) - Cyl\_base\_noise(i)$$

where Cyl_bkg_noise(i), Cyl_base_noise (i), i, and Cyl_inj_noise (i) are as previously described. If the poppet valves open or close during the time the knock window of the cylinder is open, the noise contributions of the fuel injectors may be determined via the following equation:

$$Cyl_{inj_{noise(i)}} = Cyl_{bkg_{noise(i)}} - Cyl_{vlv_{noise(i)}} - Cyl\_base\_noise(i)$$

If Cyl_vlv_noise(i) and Cyl_base_noise(i) have previously been determined. If method 200 judges that there is a request determine engine knock background noise levels with fuel injector noise included in the engine knock background noise level, then the answer is yes and method 200 proceeds to 220. Otherwise, the answer is no and method 200 proceeds to 226.

At 220, method 200 adjusts closing timings of one or more fuel injectors to close within an open knock window of one or more selected cylinders (e.g., a crankshaft angular interval where output of a knock sensor is sampled to determine the presence or absence of knock in the selected cylinder) being evaluated for engine knock background noise levels, the selected cylinder may be activated or deactivated. For example, if cylinders one, seven, six, and four are activated and cylinders three, two, five, and eight are deactivated, then a direct injection into reactivated cylinder number six may be timed such that the direct injector of cylinder number six closes in the knock window associated with deactivated cylinder number three. This allows an engine background noise level that includes injection noise to be determined for deactivated cylinder number three even though cylinder number three is deactivated. Consequently, when cylinder number three is reactivated, its engine knock background noise level may already be determined and it may be used to determine the presence or absence of engine knock.

Alternatively, timing of one or more engine knock windows of deactivated cylinders may be adjusted to determine cylinder background noise levels that include noise from fuel injectors of one or more selected cylinders. For example, as shown in FIG. 5, the time that the knock window associated with deactivated cylinder number three (e.g., 302a) is open may be adjusted (e.g., retarded) so that the knock window associated with cylinder number three is open when the intake valve of cylinder number six (e.g., 369) closes and so that the knock window is closed when the port injector of cylinder number four (e.g., 313a) closes. Thus, the crankshaft angle at which the knock window associated with the cylinder opens and the crankshaft angle at which the knock window associated with the cylinder closes may be adjusted so that the knock window associated with the cylinder is open when a fuel injector closes and so that the knock window is closed when the intake or an exhaust valves open or close.

At 222, method 200 determines an engine knock background noise level that includes fuel injector noise Cyl_inj_noise (i) for the selected cylinder or cylinders. In one example, method 200 integrates output of a vibration sensor during a portion of the open knock window of the selected cylinder to determine the engine knock background noise level with fuel injector noise. The output of the vibration sensor may be integrated numerically or via an integrator circuit to determine the base background noise level of the selected cylinder. Method 200 proceeds to 224 after determining and storing the engine knock background noise level with injector noise to controller memory.

At 224, method 200 adjusts closing timings of one or more fuel injectors to close outside of the open knock window of one or more selected cylinders being evaluated for engine knock background noise levels, the selected cylinder may be activated or deactivated. This allows fuel injector closing noise that is generated during the open knock window to be removed from the open knock window. Alternatively, timing of one or more engine knock windows of deactivated cylinders may be adjusted to remove fuel injector noise from the one or more engine knock windows of the selected cylinders. Method 200 proceeds to 226.

At 226, method 200 judges if there is a request to determine engine knock background noise levels with poppet valve noise included in the engine knock background noise level. In one example, a request to determine engine knock background noise levels with poppet valve (e.g., intake and/or exhaust valve) noise included in the engine knock background noise levels may be generated when a poppet valve is expected to close during a crankshaft interval when a knock window of the selected cylinder is open. The poppet valve may be expected to close during the crankshaft interval when the knock window of the selected cylinder is open and the engine is operating at a same or different engine speed and load as the present engine speed and load. Of course, method 200 may judge to determine engine knock background noise levels with poppet valve noise included in the engine knock background noise level according to other conditions. Further, the base engine knock background noise level may be subtracted from the engine knock background noise level with poppet valve noise included to determine the noise contribution of poppet valve closing to the total engine background noise level.

In one example, the poppet valve engine background noise level may be determined via the following equation when fuel injectors do not close during the knock window of the present cylinder being evaluated for engine knock background noise, the noise contribution of poppet valves may be determined via the following equation:

$$Cyl\_vlv\_noise(i) = Cyl\_bkg\_noise(i) - Cyl\_base\_noise(i)$$

where Cyl_bkg_noise(i), Cyl_base_noise (i), i, and Cyl_vlv_noise (i) are as previously described. If the fuel injectors open or close during the time the knock window of the cylinder is open, the noise contribution of the poppet valves may be determined via the following equation:

$$Cyl_{vlv_{noise(i)}} = Cyl_{bkg_{noise(i)}} - Cyl_{inj_{noise(i)}} - Cyl\_base\_noise(i)$$

If Cyl_inj_noise(i) and Cyl_base_noise(i) have been previously determined. If method 200 judges that there is a request determine engine knock background noise levels with poppet valve noise included in the engine knock background noise level, then the answer is yes and method 200 proceeds to 228. Otherwise, the answer is no and method 200 proceeds to 232.

At 228, method 200 adjusts closing timings of one or more poppet valves to close within an open knock window of one or more selected cylinders (e.g., a crankshaft angular interval where output of a knock sensor is sampled to determine the presence or absence of knock in the selected cylinder) being evaluated for engine knock background noise levels, the selected cylinder may be activated or deactivated. For example, if cylinders one, seven, six, and four are activated and cylinders three, two, five, and eight are deactivated, then an intake valve closing valve of deactivated cylinder number two is timed such that the intake valve of cylinder number two closes in the knock window associated with deactivated cylinder number three. This allows an engine background noise level that includes poppet valve noise to be determined for deactivated cylinder number three even though cylinder number three is deactivated. Consequently, when cylinder number three is reactivated, its engine knock background noise level may already be determined and it may be used to determine the presence or absence of engine knock. An example of adjusting poppet valve timing in this way in shown in FIG. 4 where closing of intake valve event 366 may be moved to a crankshaft angle where the knock window of cylinder number three (e.g., 302) is open.

Alternatively, timing of one or more engine knock windows of deactivated cylinders may be adjusted to determine cylinder background noise levels that include noise from poppet valves of one or more selected cylinders. For example, as shown in FIG. 5, the time that the knock window associated with deactivated cylinder number three (e.g., 302a) is open may be adjusted (e.g., advanced) so that the knock window associated with cylinder number three is open when the intake valve of cylinder number two (e.g., 366) closes and the knock window is closed when the fuel injector of cylinder number four (e.g., 313a) closes. Thus, the crankshaft angle at which the knock window associated with the cylinder opens and the crankshaft angle at which the knock window associated with the cylinder closes may be adjusted so that the knock window associated with the cylinder is open when a poppet valve closes and closed when a fuel injector opens or closes.

At 230, method 200 determines an engine knock background noise level that includes poppet valve noise Cyl_v-lv_noise (i) for the selected cylinder or cylinders. In one example, method 200 integrates output of a vibration sensor during a portion of the open knock window of the selected cylinder to determine the engine knock background noise level with poppet valve noise. The output of the vibration sensor may be integrated numerically or via an integrator circuit to determine the base background noise level of the selected cylinder. Method 200 proceeds to 232 after determining and storing the engine knock background noise level with injector noise to controller memory.

At 232, method 200 adjusts intake and exhaust valve timings to their base timings. Fuel injector timings are also adjusted back to their base timings (e.g., off since the engine is in DFSO). This allows the engine to return to its base DFSO operating conditions and it also allows the catalyst to be filled with oxygen for determining catalyst degradation. Method 200 proceeds to 234.

At 234, method 200 stores the engine knock background noise levels learned at 214-230 to controller memory. Method 200 proceeds to 236.

At 236, method 200 judges if an amount of time, beginning with the time engine cylinders were most recently reactivated at 212, to a time when an oxygen sensor located downstream of a catalyst indicates a rich air-fuel mixture is greater than a threshold amount of time. The threshold amount of time may be empirically determined via aging a catalyst and measuring an amount of time, beginning with the time engine cylinders were most recently reactivated, to a time when an oxygen sensor located downstream of a catalyst indicates a rich air-fuel mixture is greater than a threshold amount of time. If method 200 judges that the amount of time, beginning with the time engine cylinders were most recently reactivated, to a time when an oxygen sensor located downstream of a catalyst indicates a rich air-fuel mixture is greater than a threshold amount of time, then the answer is yes and method 200 proceeds to 238. Otherwise, the answer is no and method 200 proceeds to 237.

At 238, method 200 indicates that the catalyst is active and not degraded. The catalyst status may be stored in controller memory. Method 200 proceeds to 240.

At 240, method 200 judges if engine background noise with direct injectors activated has been determined. If not, the answer is no and method 200 proceeds to 242. Otherwise, the answer is yes and method 200 proceeds to 244.

At 242, method 200 activates one or more of the previously deactivated cylinders is reactivated by supplying fuel to the previously deactivated cylinder. Fuel is supplied to the cylinder via direct fuel injectors so that an amount of time it takes for an oxygen sensor downstream of a catalyst to change state from indicating lean exhaust gas to indicating rich exhaust gas after activating the previously deactivated cylinder may be determined. The amount of time may be indicative of the catalyst's capacity to convert exhaust gas to $CO_2$ and $H_2O$. If the amount of time is shorter than a threshold amount of time, the catalyst may be determined to be degraded. If the amount of time is longer than the threshold amount of time, the catalyst may be determined to be performing as desired.

Reactivating one or more of the previously deactivated cylinders provides an opportunity to adjust knock windows of deactivated cylinders to detect noise levels that may be influenced by direct fuel injectors and valve timing when there may be less influence on vehicle drivability and emissions. Further, reactivating direct injectors allows a different type of noise to be assessed in the engine knock windows. Method 200 returns to 214.

At 237, method 200 indicates that the catalyst is degraded. The catalyst status may be stored in controller memory. Further, engine operation may be adjusted to compensate for the degraded catalyst. For example, engine spark timing may be retarded to reduce engine NOx production. Method 200 proceeds to 240.

At 244, method 200 judges if engine knock background noise levels for all engine cylinders have been determined. If so, the answer is yes and method 200 proceeds to exit. Otherwise, the answer is no and method 200 proceeds to 246.

At 246, method 200 selects a new cylinder for which engine knock background noise levels may be evaluated or learned. In one example, method 200 simply increments the number of the cylinder for which the engine background noise is learned or evaluated. Method 200 returns to 214.

At 250, method selects one or more cylinders to evaluate for engine background noise levels (e.g., Cyl_bkg_noise(i), Cyl_base_noise (i), i, and Cyl_vlv_noise (i)). In one example, method 200 begins with cylinder number one and increments the selected cylinder after the engine background noise levels for the selected cylinder are determined. Method 200 also ceases fuel injection to all cylinders. Method 200 also holds intake and exhaust valves closed over at least one engine cycle if the engine is in DCCO mode. The intake and exhaust valves continue to operate if the engine is in DFSO mode. Method 200 proceeds to 252.

At 252, method 200 adjusts poppet valve timing of intake and exhaust valves if the engine is in DFSO mode so that intake and exhaust valves do not close while the engine knock window that is associated with the selected cylinder is open. If the engine is in DCCO mode, the intake and exhaust valve closing and opening events will not occur during an open knock window because the poppet valves are deactivated. Method 200 proceeds to 254.

At 254, method 200 determines a base background noise level Cyl_base_noise (i) for the selected cylinder or cylinders. In one example, method 200 integrates output of a vibration sensor during a portion of the open knock window of the selected cylinder. The output of the vibration sensor may be integrated numerically or via an integrator circuit to determine the base background noise level of the selected cylinder. Method 200 proceeds to 254.

At 256, method 200 adjusts closing timings of one or more poppet valves to close within an open knock window of one or more selected cylinders being evaluated for engine knock background noise levels if the engine is in DFSO mode. For example, a closing time of an intake valve of cylinder number three may be adjusted to occur during a crankshaft interval when a knock window associated with cylinder number seven is open for a cylinder having a firing order of 1, 3, 7, 2, 6, 5, 4, 8. The valve opening and closing events that are moved into the selected knock window may be of cylinders on the same or different cylinder bank as the selected cylinder.

Alternatively, timing of one or more engine knock windows of deactivated cylinders may be adjusted to determine cylinder background noise levels that include noise from poppet valves of one or more selected cylinders. For example, a knock window associated with cylinder number seven may be advanced so that it is open during a crankshaft interval when an intake valve of cylinder number three closes. This allows vibrations and noise from the intake valve closing of cylinder number three to be monitored in the knock window associated with cylinder number seven. The valve opening and closing events which are observable by moving the selected knock window may be cylinders on the same or different cylinder bank as the selected cylinder. Method 200 proceeds to 258.

At 258, method 200 determines an engine knock background noise level that includes poppet valve noise Cyl_vlv_noise (i) for the selected cylinder or cylinders. In one example, method 200 integrates output of a vibration sensor during a portion of the open knock window of the selected cylinder to determine the engine knock background noise level with poppet valve noise. The output of the vibration sensor may be integrated numerically or via an integrator circuit to determine the base background noise level of the selected cylinder. Method 200 proceeds to 260.

At 260, method 200 stores the engine knock background noise levels learned at 254-260 to controller memory. Method 200 proceeds to 262.

At 262, method 200 judges if engine knock background noise levels for all engine cylinders have been determined or it is desired to exit DFSO or DCCO mode. If so, the answer is yes and method 200 proceeds to 64. Otherwise, the answer is no and method 200 proceeds to 263.

At 264, method 200 reactivates the cylinders by injecting fuel to the cylinders and reactivating cylinder poppet valves if the poppet valves have been deactivated. Method 200 proceeds to exit.

At 263, method 200 selects a different cylinder to evaluate for engine knock background noise and then method 200 returns to 252.

In this way, crankshaft angles where an engine knock widow opens and closes may be advanced or retarded to determine base engine knock background noise, engine knock background noise that includes poppet valve opening and closing noise, and engine knock background noise that includes fuel injector opening and closing noise may be determined. Further, fuel injector timing, type of fuel injector injecting fuel, and poppet valve timing may be adjusted to determine base engine knock background noise, engine knock background noise that includes poppet valve opening and closing noise, and engine knock background noise that includes fuel injector opening and closing noise may be determined.

Thus, the method of FIGS. 2A-2C provides for an engine operating method, comprising: deactivating a cylinder for one or more cycles of the cylinder via a controller; learning a base engine knock background noise level associated with the cylinder while the cylinder is deactivated; and adjusting engine operation according to a knock indication determined from the base engine knock background noise level. The method includes where deactivating the cylinder includes deactivating poppet valves of the cylinder for the one or more cycles of the cylinder. The method includes where deactivating the cylinder includes ceasing to inject fuel to the cylinder while the cylinder is deactivated and poppet valves of the cylinder open and close during the one or more cycles of the cylinder. The method includes where the base engine knock background noise level does not include noise from injectors or poppet valves closing during a knock window of the cylinder. The method includes where the knock window of the cylinder is a predetermined crankshaft angle range where knock in the cylinder is expected to occur.

In some examples, the method further comprises moving closing of a poppet valve from the knock window of the cylinder in response to a request to learn the base engine knock background noise level. The method further comprises moving closing of a poppet valve into the knock window of the cylinder after learning a base engine knock background noise level associated with the cylinder, and learning an engine knock background noise level that includes noise of a poppet valve that closes during the a crankshaft angle range of the knock window. The method includes where the poppet valve is a poppet valve of a cylinder other than the cylinder.

The method of FIGS. 2A-2C also provides for an engine operating method, comprising: deactivating a group of engine cylinders for one or more cycles of an engine via a controller; reactivating a first cylinder of the group of engine cylinders to diagnose operation of a catalyst; and adjusting timing of a knock window associated with a deactivated cylinder to determine a noise level of a closing valve or a closing fuel injector of a second cylinder other than the first cylinder. The method includes where the deactivated cylinder is included in the group of engine cylinders, and where the group of engine cylinders includes all engine cylinders.

The method includes where deactivating the group of engine cylinders includes holding all poppet valves in the group of engine cylinders closed for one or more engine cycles, and wherein reactivating the first cylinder includes injecting fuel to the first cylinder via a port fuel injector and activating poppet valves of the first cylinder. The method includes where deactivating the group of engine cylinders includes operating poppet valves in the group of engine cylinders, and wherein reactivating the first cylinder includes injecting fuel to the first cylinder via a port fuel injector and activating poppet valves of the first cylinder. The method includes where reactivating the first cylinder includes injecting fuel to the first cylinder via a direct fuel injector and activating poppet valves of the first cylinder. The method includes where adjusting timing of the knock window associated with the deactivated cylinder includes adjusting timing of the knock window to be open when the closing valve or the closing fuel injector fully closes.

Referring now to FIG. 3, a timing sequence 300 that illustrates example base engine knock window timing, direct injector timing, and intake and exhaust poppet valve opening and closing timing is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences are shown visually by DI injections and poppet valve timings.

The engine knock windows for each cylinder are positioned at a level of a tick mark along the vertical axis that is associated with the knock window. For example, the engine knock window for cylinder number one is indicated by slash bar 301. Knock windows for the remaining engine cylinders (2-8) are indicated by similar slash bars (302-308) that align with labeling along the vertical axis.

The engine fuel injection timings for each cylinder are positioned at a level the tick mark along the vertical axis that is associated with the fuel injection. For example, solid bar 310 represents a DI fuel injector open interval for cylinder number two. The DI fuel injector for cylinder number two is closed when solid bar 310 is not visible. The DI fuel injector for cylinder number two opens at the left side of solid bar 310 and closes at the right side of solid bar 310. DI fuel injections for the remaining engine cylinders (2-8) are indicated by similar solid bars (311-317) and they follow the same convention as solid bar 310. The fuel injector bars 310-317 respectively align with cylinders listed along the vertical axis that the fuel injector bars correspond to.

The strokes of a cylinder are positioned just above a level the tick mark along the vertical axis that is associated with the stroke. For example, strokes for cylinder number one are indicated by horizontal lines 320-323. Letters p, e, i, and c identify the power (p), exhaust (e), intake (i), and compression (c) strokes associated with cylinder number one. Strokes for the other engine cylinders are identified in a similar way by lines 325-358.

The exhaust valve timings for each cylinder are positioned above a level the tick mark along the vertical axis that is associated with the exhaust valve timings. For example, exhaust valve opening time for cylinder number one is indicated by cross-hatched bar 360. The exhaust valves for cylinder number one are closed when no cross-hatched bar is present above the cylinder strokes of cylinder number one. Exhaust valve opening times for the other cylinders are indicated at 362, 364, 367, 370, 372, 374, 375, 377, and 378.

The intake valve timings for each cylinder are positioned above a level the tick mark along the vertical axis that is associated with the intake valve timings. For example, intake valve opening time for cylinder number one is indicated by dotted bar 361. The intake valves for cylinder number one are closed when no dotted bar is present above the cylinder strokes of cylinder number one. The intake valve opening times for the other cylinders are indicated at 363, 365, 366, 368, 369, 371, 373, 376, and 379.

FIG. 3 also includes table 301 that describes the relationship between DI fuel injection for one cylinder and engine knock background noise level for another cylinder as is illustrated in sequence 300. Table 301 includes a first label that indicates to which cylinder fuel is injected for combustion. The engine cylinder numbers arranged in the engine's firing order 1-3-7-2-6-5-4-8. The second label indicates the knock window of the cylinder that is affected by fuel injection to the cylinders combusting. Table 301 shows that the knock window of cylinder 5 is affected by fuel that is injected to combust in cylinder 1 (cylinder 1 is located above cylinder 5 in the table). Table 301 also shows that the knock window of cylinder 4 is affected by fuel that is injected to combust in cylinder 3, and so on. Thus, when fuel is directly injected to one cylinder, it may affect the engine knock background noise level of a cylinder that is three cylinders behind in the engine's order of combustion. Timings and interrelationships between port fuel injectors and cylinder knock windows may be described in a similar way. Arrows 390-397 show these relationships graphically. For example, the DI of fuel into cylinder number two at 310 may influence the engine noise observed in the knock window of cylinder number one at 301. Similarly, the DI of fuel into cylinder number six at 311 may influence the engine noise observed in the knock window of cylinder number three at 302, and so on.

The noise observed in a knock window of one cylinder may include noise related to events associated with other engine cylinders. For example, the engine knock window of cylinder number two indicated at 304 may occur at a time when the knock sensor is exposed to noise from the DI injection to cylinder number four at 313 and this linkage is shown via arrow 393. The relations between DI injections to other cylinders and the knock sensor output in other knock windows are illustrated via arrows 390-397. Thus, the engine knock background noise level determined for the engine knock window of cylinder number two shown at 304 may include noise generated by the DI injector opening and/or closing at 313. In addition, the intake valve closing of cylinder number five indicated by dotted bar 373 show that the intake valve of cylinder number five closes and may generate noise within the time that the knock window of cylinder number two is open as shown by bar 304. Further, the exhaust valve closing of cylinder number eight indicated by dotted bar 378 shows that the exhaust valve of cylinder number eight closes and may generate noise within the time that the knock window of cylinder number two is open as shown by bar 304. Further still, the exhaust valve opening of cylinder number seven indicated by bar 364 shows that the exhaust valve of cylinder number seven opens and may generate noise within the time that the knock window of cylinder number two is open as shown by bar 304. Thus, in this example, engine background noise as determined via the engine knock window for cylinder number two at 304 may include noise from DI event 313, valve event 373, valve event 364, and valve event 378.

The poppet valve and DI injection times shown in FIG. 3 may be indicative of base DI and poppet valve timings. These timings may affect the engine background noise levels determined from engine knock windows of the cylinders (e.g., 304). While it may be desirable to include all background noise sources to determine a background noise level for a particular cylinder, it may also be useful to decompose a total background noise level into the contributions from individual noise sources. By removing one or more noise influences from a total engine background noise level, it may be possible to determine engine noise levels that may be used to determine whether or not knock is present in other cylinders. For example, a base engine knock background noise level for cylinder number one may be used as a base engine knock background noise level for cylinder number three. Further, the poppet valve noise or DI injector noise of one cylinder may be applied to a different cylinder to estimate engine knock background noise for the different cylinder. Such allocations engine knock background noise levels may be useful when an engine knock background noise level has not been observed for a particular engine cylinder or if opportunities for learning engine knock background noise levels is limited by vehicle operating conditions.

Referring now to FIG. 4, a timing sequence 400 that illustrates several engine cylinders that have been reactivated after an engine enters DFSO mode. FIG. 4 also illustrates how direct fuel injections and valve timings may be adjusted to allow the determination of the total cylinder background noise level for cylinder i at the present engine speed and load Cyl_bkg_noise(i), the base cylinder background noise level that does not include noise from fuel injectors and/or intake and/or exhaust poppet valves that open and/or close during a knock window of cylinder (i) Cyl_base_noise (i), the fuel injector noise that occurs during a knock window of cylinder (i) Cyl_inj_noise (i), and the noise from intake/exhaust valves that open and/or close during a knock window of cylinder (i) Cyl_vlv_noise (i).

The fuel injections, valve timings, cylinder strokes, and engine position for each of the cylinders shown in FIG. 4 are identical to those shown in FIG. 3, except as noted below. Therefore, for the sake of brevity, the description of these items will not be repeated. Nevertheless, the timings and sequence shown in FIG. 4 is identical to that shown in FIG. 3, except as noted.

The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, the engine was operating with all cylinders deactivated in DFSO and four cylinders have just been reactivated while four cylinders remain deactivated so that a catalyst diagnostic may be performed. The deactivated cylinders are indicated by a bar above the deactivated cylinders. For example, cylinder numbers three, two, five, and eight are deactivated.

Timing of direct injections for active cylinders one, seven, six, and four has been adjusted (e.g., advanced) as compared to the fuel injection timings shown in FIG. 3. The advanced direct fuel injections are indicated at 311a, 313a, 315a, and 317a. By advancing the direct injections, fuel injection noise may be removed from knock windows 302, 304, 306, and 308 so that base cylinder background noise levels that do not include noise from fuel injectors and/or intake and/or exhaust poppet valves that open and/or close during a knock window of cylinder may be determined. Because the catalyst is being diagnosed and the engine is operating at low load, engine emissions may not increase by much via adjusting the direct injection timings. Further, intake valve closing timings may be advance or retarded as indicated at 402, 404, 406, 408, 410, 412, 414, and 416 to move intake valve closing timings into or out of engine knock windows so that base cylinder background noise level that does not include noise from fuel injectors and/or intake and/or exhaust poppet valves that open and/or close during a knock window of cylinder may be determined or so that engine knock background noise levels that includes poppet valve noise Cyl_vlv_noise may be determined.

Likewise, exhaust valve closing timings may be advance or retarded as indicated at 403, 405, 407, 409, 411, 413, 415, and 417 to move exhaust valve closing timings into or out of engine knock windows so that base cylinder background noise level that does not include noise from fuel injectors and/or intake and/or exhaust poppet valves that open and/or close during a knock window of cylinder may be determined or so that engine knock background noise levels that includes poppet valve noise Cyl_vlv_noise may be determined.

Thus, by determining engine knock background noise levels during DFSO or DCCO, it may be possible to obtain accurate engine noise levels without significantly changing engine emissions. In addition, knock windows of deactivated cylinders may be utilized to determine engine knock background noise levels even though cylinders associated with the knock windows are deactivated.

Referring now to FIG. 5, a timing sequence 500 that illustrates several engine cylinders that have been reactivated after an engine enters DFSO mode. FIG. 5 also illustrates how port fuel injections and knock window timings may be adjusted to allow the determination of the total cylinder background noise level for cylinder i at the present engine speed and load Cyl_bkg_noise(i), the base cylinder background noise level that does not include noise from fuel injectors and/or intake and/or exhaust poppet valves that open and/or close during a knock window of cylinder (i) Cyl_base_noise (i), the fuel injector noise that occurs during a knock window of cylinder (i) Cyl_inj_noise (i), and the noise from intake/exhaust valves that open and/or close during a knock window of cylinder (i) Cyl_vlv_noise (i).

The valve timings, cylinder strokes, and engine position for each of the cylinders shown in FIG. 5 are identical to those shown in FIG. 3, except as noted below. Therefore, for the sake of brevity, the description of these items will not be repeated. Nevertheless, the timings and sequence shown in FIG. 5 is identical to that shown in FIG. 3, except as noted.

The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, the engine was operating with all cylinders deactivated in DFSO and four cylinders have just been reactivated while four cylinders remain deactivated so that a catalyst diagnostic may be performed. The deactivated cylinders are indicated by a bar above the deactivated cylinders.

Timing of knock windows associated with deactivated cylinders three, two, five, and eight has been adjusted (e.g., retarded) as compared to the knock window timings shown in FIG. 3. The retarded knock windows are indicated at 302a, 304a, 306a, and 308a. By retarding the knock window opening times, port fuel injection noise may be determined from port injections 313a, 315a, 317a, and 311a. If it is desired to determine base engine knock background noise levels, then the engine knock windows of the deactivated cylinders may be advanced as indicated by arrows 502a, 504a, 506a, and 508a or retarded as indicated by arrows 502b, 504b, 506b, and 508b. For example, the engine knock windows of deactivated cylinders may be advanced or retarded according to engine crankshaft position to add or remove poppet valve and fuel injector closing or openings from the knock windows of deactivated cylinders.

This allows knock windows that are associated with deactivated cylinders to be used to determine engine noise levels even though the cylinders that the knock windows are associated with are deactivated. Further, engine knock windows may be increased in duration, decreased in duration, have starting times modified, and have stopping times modified to increase or decrease noise of one or more engine noise sources (e.g., fuel injectors and poppet valves).

Thus, by determining engine knock background noise levels during DFSO or DCCO by moving knock windows, it may be possible to obtain accurate engine noise levels without significantly changing engine emissions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   deactivating a cylinder for one or more cycles of the cylinder via a controller;
   learning a base engine knock background noise level associated with the cylinder while the cylinder is deactivated, where the base engine knock background noise level does not include noise from injectors or poppet valves closing during a knock window of the cylinder;
   adjusting engine operation according to a knock indication determined from the base engine knock background noise level; and
   moving closing of a poppet valve into the knock window of the cylinder after learning a base engine knock background noise level associated with the cylinder while the cylinder is deactivated, and learning an engine knock background noise level that includes noise of the poppet valve that closes during the knock window.

2. The method of claim 1, where deactivating the cylinder includes deactivating poppet valves of the cylinder for the one or more cycles of the cylinder.

3. The method of claim 1, where deactivating the cylinder includes ceasing to inject fuel to the cylinder while the cylinder is deactivated and poppet valves of the cylinder open and close during the one or more cycles of the cylinder.

4. The method of claim 1, where the knock window of the cylinder is a predetermined crankshaft angle range where knock in the cylinder is expected to occur.

5. The method of claim 1, where the poppet valve is a poppet valve of a cylinder other than the cylinder.

6. An engine operating method, comprising:
   deactivating a group of engine cylinders for one or more cycles of an engine via a controller;
   reactivating a first cylinder of the group of engine cylinders to diagnose operation of a catalyst; and
   adjusting timing of a knock window associated with a deactivated cylinder to determine a noise level of a closing valve or a closing fuel injector of a second cylinder other than the first cylinder.

7. The method of claim 6, where the deactivated cylinder is included in the group of engine cylinders, and where the group of engine cylinders includes all engine cylinders.

8. The method of claim 6, where deactivating the group of engine cylinders includes holding all poppet valves in the group of engine cylinders closed for one or more engine cycles, and wherein reactivating the first cylinder includes injecting fuel to the first cylinder via a port fuel injector and activating poppet valves of the first cylinder.

9. The method of claim 6, where deactivating the group of engine cylinders includes operating poppet valves in the group of engine cylinders, and wherein reactivating the first cylinder includes injecting fuel to the first cylinder via a port fuel injector and activating poppet valves of the first cylinder.

10. The method of claim 6, where reactivating the first cylinder includes injecting fuel to the first cylinder via a direct fuel injector and activating poppet valves of the first cylinder.

11. The method of claim 6, where adjusting timing of the knock window associated with the deactivated cylinder includes adjusting timing of the knock window to be open when the closing valve or the closing fuel injector fully closes.

12. A system for operating an engine, comprising:
- the engine including at least one vibration sensing engine knock sensor; and
- a controller including executable instructions stored in non-transitory memory to adjust timing of a knock window of a deactivated cylinder such that the knock window is open when a poppet valve of a different cylinder closes, where the knock window is adjusted in response to a request to diagnose a catalyst.

13. The system of claim 12, where the different cylinder is an activated cylinder.

14. The system of claim 12, where the deactivated cylinder is deactivated via holding poppet valves of the deactivated cylinder closed for one or more engine cycles.

15. The system of claim 12, further comprising additional instructions to activate the different cylinder via port injecting fuel to the different cylinder in response to the request to diagnose the catalyst.

16. The system of claim 12, further comprising additional instructions to activate the different cylinder via direct injecting fuel to the different cylinder in response to the request to diagnose the catalyst.

* * * * *